(12) United States Patent
Padmanabh et al.

(10) Patent No.: US 8,873,438 B2
(45) Date of Patent: Oct. 28, 2014

(54) METHOD AND SYSTEM FOR ADAPTIVE AGGREGATION OF DATA IN A WIRELESS SENSOR NETWORK

(75) Inventors: Kumar Padmanabh, Uttar Pradesh (IN); Sunil Kumar Vuppala, Karnataka (IN)

(73) Assignee: Infosys Limited (IN)

( * ) Notice: Subject to any disclaimer, the term of this patent is extended or adjusted under 35 U.S.C. 154(b) by 578 days.

(21) Appl. No.: 12/893,608

(22) Filed: Sep. 29, 2010

(65) Prior Publication Data

US 2012/0076058 A1 Mar. 29, 2012

(51) Int. Cl.
*H04L 12/56* (2006.01)
*H04L 12/891* (2013.01)
*H04W 28/10* (2009.01)
*H04L 12/801* (2013.01)
*H04W 84/18* (2009.01)
*H04W 28/06* (2009.01)

(52) U.S. Cl.
CPC .............. *H04L 47/41* (2013.01); *H04W 28/10* (2013.01); *H04L 47/14* (2013.01); *H04W 84/18* (2013.01); *H04W 28/065* (2013.01)
USPC ........................................................ 370/310

(58) Field of Classification Search
CPC ... H04W 28/10; H04W 28/065; H04W 84/18; H04L 47/41; H04L 47/14; H04L 2209/805; H04L 63/0428; H04L 63/06; H04L 67/12; H04L 9/0891; H04L 9/083
USPC .................................. 370/310, 338; 340/539
See application file for complete search history.

(56) References Cited

U.S. PATENT DOCUMENTS

| | | | |
|---|---|---|---|
| 2006/0088014 A1* | 4/2006 | Ganesh | 370/338 |
| 2008/0019372 A1* | 1/2008 | Mie et al. | 370/395.1 |
| 2010/0135494 A1* | 6/2010 | Armknecht et al. | 380/270 |

OTHER PUBLICATIONS

Padmanabh et al., Prioritized Buffer Management Policy for Wireless Sensor Nodes, Dated May 29, 2009, IEEE.*
Kumar Padmanabh, Prioritized Buffer Management Policy for Wireless Sensor Nodes (IEEE), May 29, 2009, Pertinent pp. 6.*
IEEE: Prioritized Buffer Management Policy for Wireless Sensor Nodes, dated May 29, 2009.*

* cited by examiner

*Primary Examiner* — Jae Y Lee
*Assistant Examiner* — Jean F Voltaire
(74) *Attorney, Agent, or Firm* — Cantor Colburn LLP (57) ABSTRACT

A method and system for adaptive aggregation of data in a Wireless Sensor Network (WSN) is disclosed. The method receiving one or more packets produced from a plurality of sensor nodes at an aggregator sensor node. The method further includes categorizing and storing the received packets in the buffer queue of the aggregator node. Then initiating an aggregation process by selecting an aggregation mechanism. The aggregation mechanism is selected based on the feedback value and a special instruction. The aggregated packets are forwarded to the base station based on an aggregation function.

30 Claims, 4 Drawing Sheets

METHOD AND SYSTEM FOR ADAPTIVE AGGREGATION OF DATA IN A WIRELESS SENSOR NETWORK

TECHNICAL FIELD

The present invention generally relates to wireless sensor networks, and particularly, to a method and system for performing an adaptive aggregation of wireless sensor data.

BACKGROUND

A wireless sensor network (hereinafter referred to as "WSN") is a network of sensor nodes. The WSN is distributed in nature and is an event-based system. Due to the size and battery power limitation, sensor nodes typically have limited storage capability, limited resources and limited network bandwidth. These limitations of the sensor nodes demand specialized optimization techniques.

Typical WSN applications with a large number of sensor nodes are covered over a specific target area in close proximity of each other. In such deployments, spatial correlation of data is observed where neighboring sensor nodes report sensor data with a high degree of correlation. Similarly, temporal correlation of data is also observed in sensed environment data, where successive sensed data are found to be identical and vary slowly, except in the case of unexpected events. Moreover, there is redundancy in the sensor data. The communication cost imposed due to redundant data unnecessarily consumes lifetime of the sensor nodes as also the bandwidth.

In such a scenario, in a typical WSN, a large amount of information (spatial or temporal) can be combined together and represented by the same number of bits. This process is known as data aggregation. The aggregation mechanism can be lossless or lossy. In a lossless aggregation, more information is embedded in a single packet, thereby combining all headers into a single header and same data bits. In lossy aggregation, several pieces of information are passed through an aggregation function that generates a single packet having no details about the original information. Each aggregation mechanism has its own inherent drawbacks.

Research has been carried out in the art to address such drawbacks by optimizing the data aggregation mechanism. One approach includes enhance performance issues of sensor data aggregation for delaying energy trade-off in the presence of non-trivial aggregation. Another approach uses a fixed amount of time or packets to be aggregated in the aggregation mechanism. Still another approach teaches energy-accuracy tradeoff in which either a snapshot aggregation or a periodic aggregation is performed.

Several research works in the literature have discussed the problems and approaches of developing data aggregation processes mainly for energy, bandwidth and memory space savings by minimizing the data transferred in WSN. However, the proposed mechanisms in the art are too complex to be implemented in hardware using the current state of the art.

Thus all the techniques mentioned above in the art have one or more limitations. Accordingly, there is a need in the art for designing a data aggregation mechanism, which a) provides quality of service in data aggregation, b) is adaptive, and c) provides proper scheduling.

SUMMARY OF THE INVENTION

A method and system for adaptive aggregation of data in a wireless sensor network (WSN) are disclosed. The method helps in optimizing the data aggregation mechanism, thus overcoming problems of traditional data aggregation mechanisms. Also, the method helps in minimizing redundant data being transferred to the base station from the sensor nodes, thereby improving issues such as energy, bandwidth and memory that are inherent to any WSN.

In one embodiment of the present technique, the method for adaptive data aggregation in the WSN includes the step of receiving one or more packets produced from a plurality of sensor nodes at an aggregator sensor node. The packet may be produced by the sensor nodes by performing a local aggregation of data produced by that sensor node. The aggregator sensor node may categorize and store the packets in a buffer queue. The aggregator sensor node may then initiate an aggregation process by selecting an aggregation mechanism for aggregating the received packets. The aggregation mechanism is selected based on a feedback value and a special instruction.

Further, the category of packets may include hello packets, normal packets, critical packets, and control packets.

In one embodiment of the present technique, an aggregation mechanism comprising an aggregation technique is selected based on a special instruction. The aggregation technique, in one embodiment of the present technique, may be lossy aggregation or lossless aggregation. In another embodiment of the present technique, the aggregation technique may be time-based aggregation or a count-based aggregation. The aggregation mechanism further specifies the number of packets to be considered for aggregation.

In one embodiment of the present technique, the aggregation process is an iterative process.

In one embodiment of the present technique, the feedback value includes the number of packets to be considered for aggregation at the aggregator sensor node. The number of packets is calculated based on at least one of a degree of aggregation (DoA) value of a previously aggregated packet and the number of packets of a particular category in the buffer queue of the aggregator node.

In one embodiment of the present technique, the number of packets to be considered for aggregation as obtained from the special instruction can be overruled by the number of the packets calculated through the feedback value.

The special instruction generated at the base station may be based either on an application for which the plurality of sensor nodes were deployed in WSN or on information derived from the control packets that are received from the plurality of sensor nodes of the WSN.

In another embodiment of the present technique, the aggregated packets from the aggregator sensor node are forwarded to the base station based on an aggregation function.

BRIEF DESCRIPTION OF THE DRAWINGS

The above mentioned features as well other features, aspects, and advantages of the present invention will become better understood when the following detailed description is read with reference to the accompanying drawings in which like characters represent like parts throughout the drawings, wherein.

DETAILED DESCRIPTION

The following description is full and informative description of the best method and system presently contemplated for carrying out the present invention, which is known to the inventors at the time of filing the patent application. Of course, many modifications and adaptations will be apparent to those skilled in the relevant arts in view of the following description, in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

The present invention relates to a method and system for performing aggregation of data in a WSN. The method details an approach for providing quality of service in data aggregation, adaptive aggregation mechanism, and proper scheduling for aggregation. The inventive technique to be detailed in the subsequent sections also explains numerous variations to implement the inventive steps of the present technique in terms of one or more embodiments.

The following description is presented to enable a person of ordinary skill in the art to make and use the invention and is provided in the context of the requirement for obtaining a patent. The present description is the best presently contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

Figure 1:
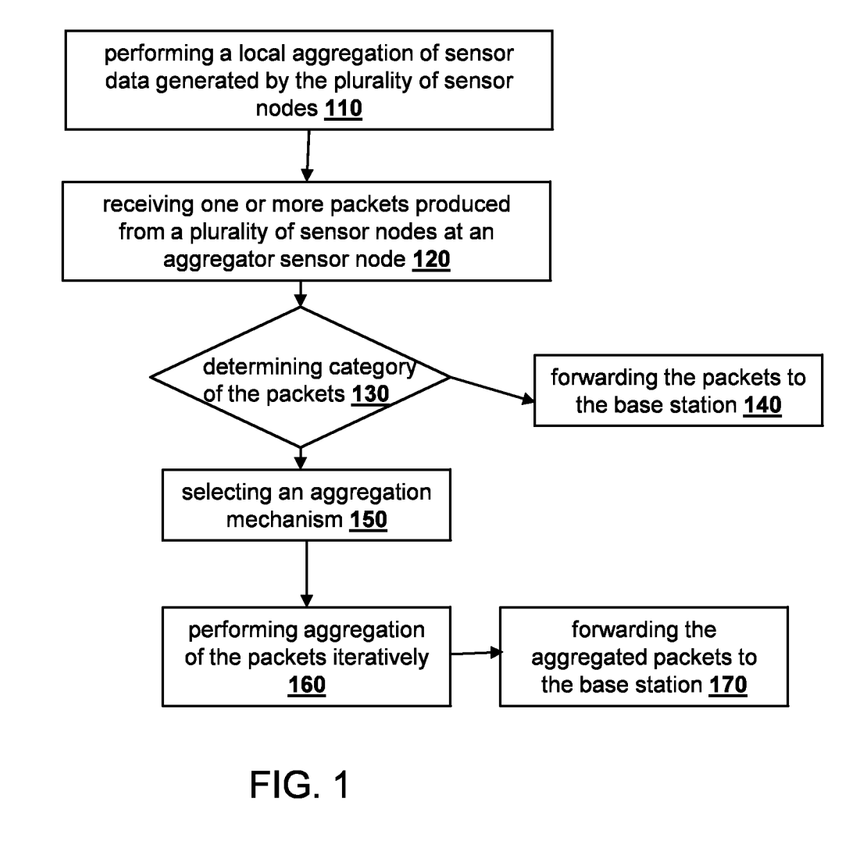
FIG. 1 is a flow diagram depicting a holistic method of performing aggregation of data in a Wireless Sensor Network (WSN), according to one embodiment of the present technique.

Referring to the figures, FIG. 1 is a flow diagram depicting a holistic method of performing aggregation of data in the WSN, according to one embodiment of the present technique. The method comprises 1) performing a local aggregation of sensor data generated by a plurality of sensor nodes (step 110), 2) receiving one or more packets produced from the plurality of sensor nodes at an aggregator sensor node (step 120), 3) determining a category of the one or more packets (step 130), 4) forwarding the one or more packets to the base station (step 140), 5) selecting an aggregation mechanism (step 150), 6) performing aggregation of the one or more packets iteratively (step 160), and 7) forwarding the aggregated one or more packets to the base station (step 170). Each of the steps is explained in detail in the subsequent paragraphs.

The holistic method of performing aggregation of data in the WSN, as per one embodiment of the present technique, may begin with a step of performing local aggregation of the sensor data generated by the plurality of sensor nodes as represented by step 110. In step 110, each sensor node in the WSN environment may perform aggregation of data that it has generated. In one embodiment of the present technique, the sensor data is locally aggregated by the sensor node for at least one of a spatial correlation or a temporal correlation of sensor data. In the step of local aggregation, sensor data generated by each sensor node is locally aggregated before forwarding the data or packets to a sink/base station or to an aggregator sensor node. Each sensor node in the WSN may perform local aggregation of data before forwarding the packets to the sink or base station or to the aggregator sensor node. Each sensor node checks whether local aggregation is possible before performing local aggregation. If local aggregation is possible, each sensor node stores the sensor data and waits for the next sensor data or reading before generating locally aggregated data or packet. If local aggregation is performed, it is indicated by a type field in the packet to indicate that the packet is locally aggregated at the aggregator sensor node.

In another embodiment of the present technique, the data generated by each sensor node can be forwarded as-is to the aggregator sensor node, without performing local aggregation of sensor data.

In one embodiment of the present technique, the one or more packets produced by the local sensor nodes are received by an aggregator sensor node. The received packets are stored in the buffer queue of the aggregator node. Before storing the received packets in the buffer queue of the aggregator node, the category of the packets is determined, as represented in step 130. Additionally the priorities of the packets are also determined.

In one embodiment of the present technique, the categories of the packets includes a hello packet, normal packets, critical packets, and control packets. If the packets are control packets or critical packets, the packets are forwarded from the aggregator node to the sink or the base station without any aggregation, as represented in step 140.

In one embodiment of the present technique, if the categories of the received packets are identified as hello packets or normal packets, the packets are considered for aggregation and are segregated and stored in the buffer queue of the aggregator node. The segregation is a process of separating a particular category of packets from among the plurality of packets received at the aggregator node and stacking it in the buffer queue. In one embodiment of the present technique, stacking is performed by appending the packets in the buffer based on the priority of the packets.

In one embodiment of the present technique, in step 150 an appropriate aggregation mechanism is selected. The selection of the aggregation mechanism is based on a feedback value and a special instruction. The feedback value provides details of the number of packets to be considered for aggregation at the aggregator node. In one embodiment of the present technique, the process of aggregation is an iterative process. Further, the special instruction is generated at the base station.

In one embodiment of the present technique, the special instruction is generated based on occurrence of a predefined condition in the sensed environment. In another embodiment of the present technique, the special instruction is generated based on an application for which the plurality of sensor nodes was deployed in WSN.

In one embodiment of the present technique, the aggregation of data is performed for the same category of packets taken from the buffer queue. In another embodiment of the present technique, the aggregation of data is performed for different categories of packets taken from the buffer queue.

In one embodiment of the present technique, the packets are selected from the buffer queue and the aggregation of packets is performed based on the feedback value and the special instruction. The aggregated packets are then forwarded to the base station, as recited in step 170. The aggregation technique is selected based on the details of the aggregation mechanism chosen for that particular round of aggregation. The techniques used for the aggregation may vary depending on the aggregation mechanism selected, which, in turn, is based on the feedback value and the special instruction. In one embodiment of the present technique, the technique used for aggregation may include lossy aggregation, lossless aggregation, time-based aggregation and count-based aggregation.

Figure 2:
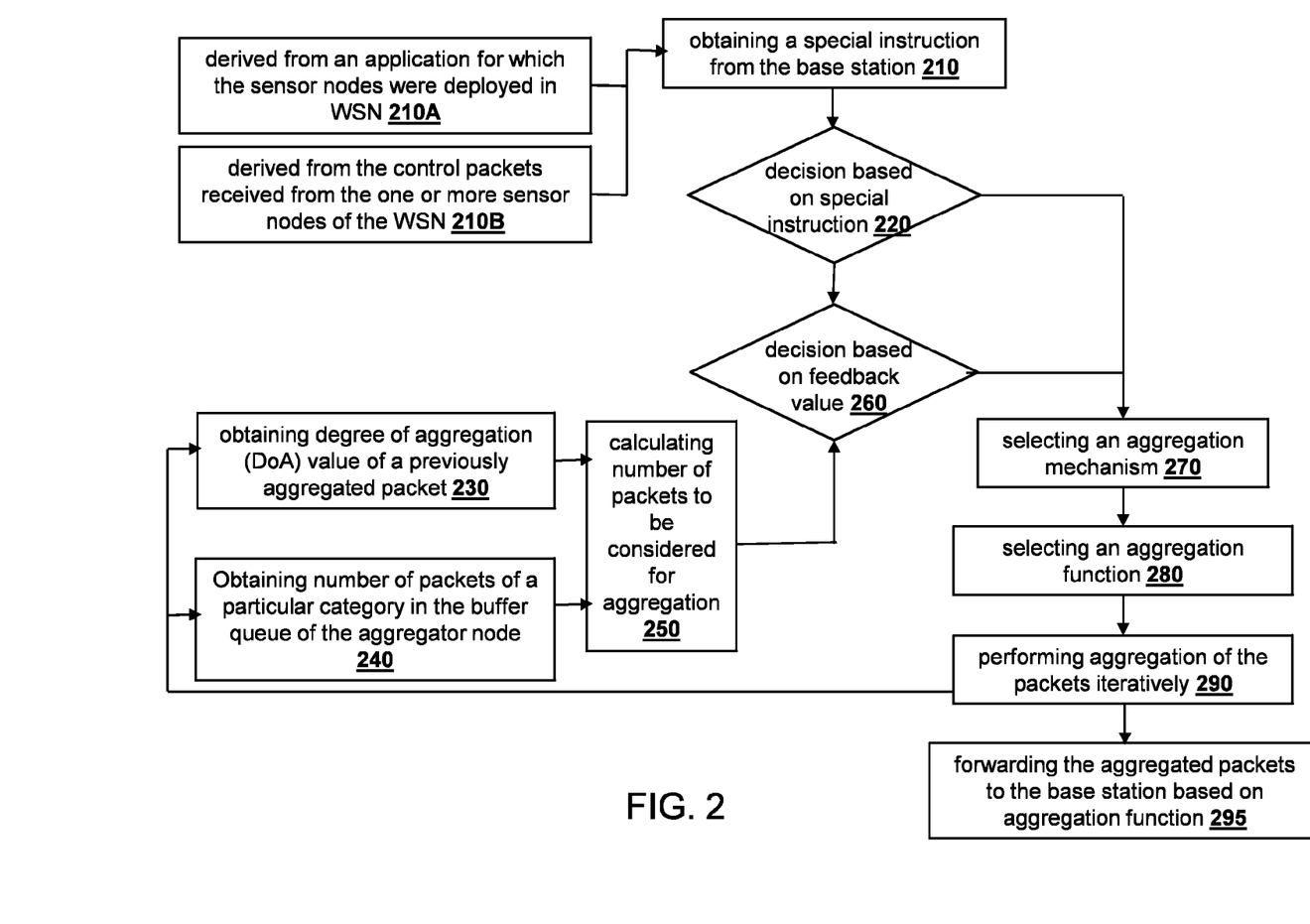
FIG. 2 is a flow diagram depicting a method of performing adaptive aggregation of data in the WSN, according to one embodiment of the present technique.

Referring to the figures, FIG. 2 is a flow diagram depicting the method of performing adaptive aggregation of data in the WSN, according to one embodiment of the present technique. The method comprises 1) obtaining a special instruction from the base station (step 210), 2) taking a decision based on the special instruction (step 220), 3) obtaining degree of aggregation (DoA) value of a previously aggregated packet (step 230), 4) obtaining number of packets of a particular category in the buffer queue of the aggregator node (step 240), 5) computing number of packets to be considered for aggregation (step 250), 6) taking a decision based on a feedback value (step 260), 7) selecting an aggregation mechanism (step 270), 8) selecting an aggregation function (step 280), 9) performing aggregation of the packets iteratively (step 290), and 10) forwarding the aggregated packets to the base station based on the aggregation function (step 295). Each of the steps is explained in detail in the subsequent sections.

In one embodiment of the present technique, the step of performing adaptive aggregation begins with obtaining the special instruction from the base station, as mentioned in step 210.

In one embodiment of the present technique, the special instruction is generated at the base station on occurrence of a predefined condition. The predefined conditions may include critical information derived at the base station from the control packets received from the one or more sensor nodes of the WSN, as mentioned in step 210B. In one embodiment of the present invention, the critical information may include a sudden burst of packets indicating drastic variation in the sensed environment. The control packets may indicate the need for manual attention to address such variations in the sensed environment.

In another embodiment of the present technique, the special instruction is generated based on an application for which the plurality of sensor nodes were deployed in the WSN, as mentioned in step 210A. The special instruction that is generated based on the application for which the plurality of sensor nodes were deployed in the WSN may be set initially during the deployment of the sensor nodes for that application.

The generation of the special instruction at the base station is an iterative process and aggregation of packets at the aggregation node is based on the special instruction generated at each such instance.

In one embodiment of the present technique, the special instruction comprises one or more details that may be used to select the aggregation mechanism. The one or more details include the aggregation technique and the number of packets to be considered for aggregation. The aggregation technique may further include lossy aggregation, lossless aggregation, time-based aggregation and count-based aggregation.

In one embodiment of the present technique, the special instruction generated at the base station based on the application can be overruled by the special instruction generated at the base station based on the critical information derived from the control packets. The special instruction generated based on the application specifies the particular aggregation technique to be used for aggregation. Further, the special instruction includes the number of packets to be considered for aggregation at each round of aggregation. The information of number of packets to be considered for aggregation is considered for the initial round of aggregation, after which the number is decided based on a feedback value. The special instruction generated based on the critical information derived from the control packets also includes a process to decide which aggregation technique needs to be used for aggregation. The parameter may include referencing to a table (i.e. Table 1) that suggests the particular aggregation technique to be selected for aggregation of packets.

It should be noted that Table 1, referenced below, is just an exemplary illustration of parameters to select the appropriate aggregation technique and the number of packets to be considered for aggregation for each round of aggregation based on the information derived from the control packets in the event of variation in the sensed environment. A lot of variations in the parameters to select the aggregation technique and the number of packets are possible. As such, this exemplary illustration of process should not restrict the scope of the patent technique.

TABLE 1

| S. No. | Aggregation technique | Frequency of the control packets/min | Number of packets for aggregation at each round |
|---|---|---|---|
| 1 | Lossy Aggregation | 10 | 8 |
| 2 | Losseless aggregation | 4 | 2 |
| 3 | Time-Based aggregation | 8 | 1 min |
| 4 | Count-Based aggregation | 6 | 5 |

In one embodiment of the present technique, if the special instruction is generated based on the information derived from the control packets at the base station, the subsequent step of obtaining the feedback value is bypassed and the packets are directly subjected to aggregation at the aggregation node. Referring to step 270, the aggregation of the packets is performed as per the selection of an aggregation mechanism as recited in table 1. The selected aggregation mechanism may include the aggregation technique and the number of packets/time interval to be used for aggregation.

In one embodiment of the present technique, the aggregation function is also defined during the aggregation, as recited in step 280. The aggregation function includes at least one of a single hop function and a multi hop function. Functions such as average and standard deviation are limited to one hop only in the aggregation step, whereas functions such as like minimum and maximum may continue aggregation till the packets reach the base station, further reducing the number of packets transferred in the WSN.

In one embodiment of the present technique, the aggregation function is one hop function in case of the special instruction being generated based on the information derived from the control packets at the base station.

The numbers of packets at the aggregation sensor nodes is picked from the buffer queue and aggregation is performed based on the selected aggregation mechanism and function, as recited in step 290. In one embodiment of the present technique, the packets picked for aggregation at the aggregation node may be of a similar category. In another embodiment of the present technique, the packets picked from the buffer queue of aggregator node for aggregation may belong to different categories.

In one embodiment of the present technique, the aggregated packets are forwarded towards the base station, as recited in step 295. The aggregation function selected determines whether any more round of aggregation needs to be performed before forwarding to the base station.

In one embodiment of the present technique, the generation of special instruction can switch back to the instruction generated based on the application after the instruction generated based on the information derived at the base station is completed. The condition to determine the completion may be that no critical information is derived from the control packets received at the base station.

In one embodiment of the present technique, the feedback value is generated based on at least one of a degree of aggregation (DoA) value of a previously aggregated packet, as recited in step 230 and number of packets of a particular category in the buffer queue of the aggregator node, as recited in step 240.

In one embodiment of the present technique, the DoA is determined as a ratio of total number of bits in all packets to the total number of bits in the aggregated packet. The DoA value at the initial aggregation step is set based on the application and subsequent DoA values are calculated based on previous aggregation values of the packets.

In one embodiment of the present technique, the number of packets in the buffer queue of the aggregator nodes is also determined and provided as an input for generation of feedback value.

In one embodiment of the present technique, the feedback value is calculated to determine the number of packets to be considered for aggregation at each round of aggregation, as recited in step 250. The feedback value may be calculated using the DoA value of the previous aggregated packet and the number of the packets belonging to each category in the buffer queue of the aggregator node.

In one embodiment of the present technique, the number of packets to be considered for aggregation is calculated based on at least one of a range of packets and a time interval chosen for the aggregation process. The illustration of parameters used for calculating the number of packets to be considered for aggregation is shown in table 2. A lot of variations in the parameters to select the number of packets to be considered for aggregation are possible. As such the exemplary illustration of parameters as per the table 2 should not restrict the scope of the patent technique.

TABLE 2

| S. No. | Range of packets | Time | Number of packets for aggregation at each round |
|---|---|---|---|
| 1 | <10 | 10 sec | 8 |
| 2 | >=11 & <25 | 20 sec | 19 |
| 3 | >=26 & <50 | 30 sec | 28 |
| 4 | >=51 & <100 | 50 sec | 48 |

In one embodiment of the present technique, the range of packets and the time interval chosen for the aggregation are selected based on the application for which the plurality of sensor nodes are deployed in the WSN.

In another embodiment of the present technique, the range of packets and the time interval chosen for the aggregation parameters as recited in Table 2 are periodically updated based on continuous learning of the aggregation process.

In one embodiment of the present technique, the number of packets to be considered for aggregation as obtained from the special instruction can be overruled by the number of the packets calculated through the feedback value.

In one embodiment of the present technique, the decision for selection the aggregation mechanism is made based on the feedback value about the number of packets to be considered for aggregation, type of packets to be considered for aggregation and the aggregation technique to be used for aggregation, as recited in step 260. The decision on the type of packets to be considered for aggregation is made based on the information about number of packets of each category in the buffer queue of the aggregator node.

In one embodiment of the patent technique, a selection process may be employed for determining the type of packets to be considered for aggregation, as shown in Table 3. The parameters may be application specific or may be based on the number of packets in the buffer queue. The packets considered for aggregation may belong to the same category or to different categories. A lot of variations in the selection parameters used to select the category of packets to be considered for aggregation are possible. As such, this exemplary illustration of parameters should not restrict the scope of the patent technique.

TABLE 3

| S. No. | Category of packets in buffer queue | Number of packets | Selection of category for aggregation |
|---|---|---|---|
| 1 | A | <50 | Similar Category |
| 2 | B | <100 | Similar Category |
| 3 | A | >=51 | Different Category |
| 4 | B | >=101 | Different Category |

In one embodiment of the present technique, an aggregation mechanism is selected for performing aggregation of the packets at the aggregation sensor node, as recited in step 270. The aggregation mechanism includes the aggregation technique and the number of packets to be considered for aggregation. The aggregation technique details are obtained through the special instruction, wherein the numbers of packets to be considered for aggregation are obtained through feedback value.

In one embodiment of the present technique, the aggregation function is defined during the aggregation, as recited in step 280. The aggregation function includes at least one of a single hop function and a multi hop function. The aggregation functions such as average & standard deviation are limited to one hop only in the aggregation step. Whereas aggregation function such as minimum, maximum can continue aggregation till the packets reaches the base station, further reducing the number of packets transferred in the WSN.

In one embodiment of the present technique, the aggregation function is a multi hop function unless there is a special requirement for aggregating the packets in one hop.

The numbers of packets at the aggregator sensor nodes is picked from the buffer queue of the aggregator node and aggregation is performed based on the selected aggregation mechanism and function, as recited in step 290. In one embodiment of the present technique, the packets picked for aggregation from the aggregator node can be of similar category. In another embodiment of the present technique, the packets picked from the buffer queue of aggregator node for aggregation can belong to a different category. The selection of category of packets is performed as described with reference to Table 3.

In one embodiment of the present technique, the aggregated packets are forwarded to the base station, as recited in step 295. The aggregation function selected determines whether any more round of aggregation needs to be performed before forwarding the aggregated packets to the base station.

Figure 3:
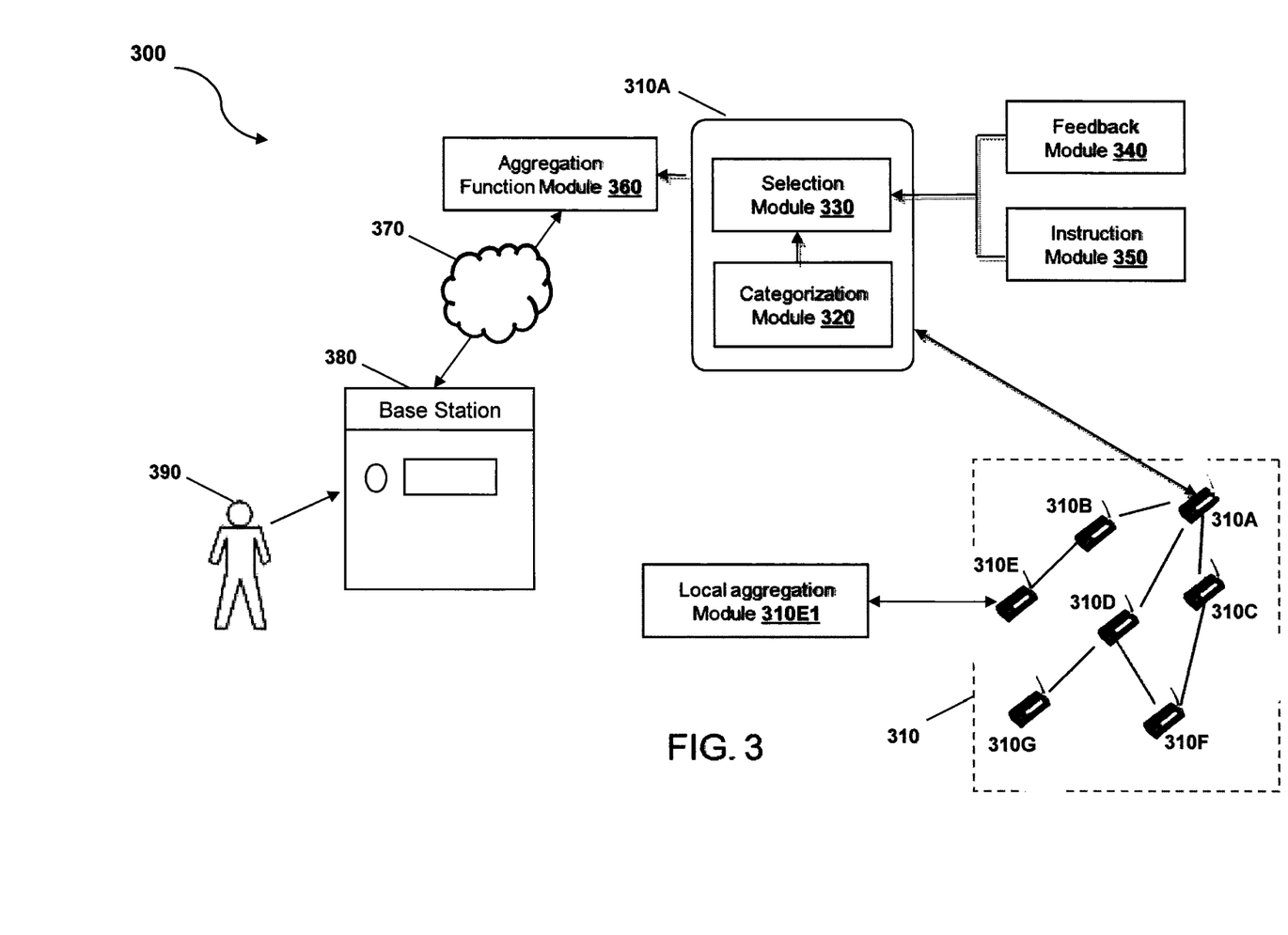
FIG. 3 is a block diagram illustrating aggregation of data in the WSN, according to one embodiment of the present technique.

Referring to the figures, FIG. 3 is a block diagram illustrating aggregation of data in the WSN, according to one embodiment of the present technique.

In one embodiment of the present technique, the system diagram 300 illustrates a system for aggregating of data in the WSN. In one embodiment of the present technique, the system 300 includes at least one of a sensor network 310, an aggregator sensor node 310A, an aggregator function module 360, a network 370, a base station 380 and a user 390.

In one embodiment of the present technique, the sensor network 310 may include a plurality of sensor nodes 310A-310G. The number of sensor node as depicted is for illustration purpose only; the depiction should not restrict the scope of the present technique. Of the sensor nodes 310A to 310G at least one sensor node may be an aggregator sensor node and the rest are the source sensor nodes. The number of aggregator nodes and the source sensor nodes in the WSN is application specific.

In system 300 sensor node 310A is an aggregator sensor node while the rest of them are source sensor nodes 310B-G. In one embodiment of the present technique, any one of the sensor nodes 310B-G can perform the function of local aggregation. The local aggregation can be performed by all sensor nodes in the WSN, apart from the aggregator sensor node 310A. For illustration purpose, the sensor node 310E comprises a local aggregation module 310E1 for performing local aggregation of data. The local aggregation of data is performed by storing the sensor data in the local aggregation module 310E1 and waiting for the next sensor readings before generating the packets.

The generated packets from the source sensor nodes 310B-G are sent to the aggregator sensor node 310A. The aggregator sensor node 310A includes at least one of a categorization module 320 and a selection module 330. The categorization module 320 comprises a buffer for storing the received packets from the source sensor nodes 310B-G. The categorization module categorizes the plurality of received packets based on the category of the packet before storing the packet in the buffer in a queue. The packet category may include hello packets, control packets, critical packets and normal packets.

It should be noted that the critical packets are not aggregated at the aggregator sensor node. Further, they are not stored in the buffer queue. The packets that belong to the remaining categories are stored in the buffer queue of the aggregator node.

In one embodiment of the present technique, the selection module 330 is used to select an aggregation mechanism to be used for aggregating the packets that are stored in the buffer queue of the categorization module 320. The selection module 330 comprises a feedback module 340 and a instruction module 350 for aiding in determining the aggregation mechanism for aggregation of the packets.

In one embodiment of the present technique, the instruction module 350 gets inputs from the base station regarding determining the aggregation techniques to be used for aggregation. The inputs for determining the aggregation techniques are generated at the base station based on the application for which the WSN is setup or based on the information derived from the control packets received at the base station. The types of aggregation techniques include at least one of a lossy aggregation, lossless aggregation, count-based aggregation and time-based aggregation. The instruction module may also provide an input regarding to number of packets to be used for aggregation.

In one embodiment of the present technique, the feedback module 340 provides details related to number of packets to be considered for aggregation. The details related to number of packets are calculated based on the DoA value of the previously aggregated packet. It also provides details related to the category of packets to be considered for aggregation. The category details are obtained based on the number of packets stored in the buffer queue of the categorization module 320 of the aggregator node 310A. The DoA value for the initial aggregation may be set to a specific value based on the application for which the WSN is setup.

In one embodiment of the present technique, the number of packets calculated to be considered for aggregation through a feedback module 340 may override the number of packets details obtained from the instruction module 350.

In one embodiment of the present technique, the aggregator sensor node 310A performs aggregation based on the feedback value obtained through the feedback module 340 and the special instruction obtained through the instruction module 350. The feedback value includes the number of packets to be considered for aggregation. Additionally it may include the category of packets to be considered for aggregation. The special instruction may include the aggregation technique to be used for aggression. The aggregation technique may include lossy aggregation, lossless aggregation, count-based aggregation and a time-based aggregation.

In one embodiment of the present technique, the aggregation is an iterative process. The special instruction and the feedback value are obtained iteratively by the selection module 330 for deciding a suitable proper aggregation mechanism to be employed for aggregation of packets that are stored at the categorization module 320.

In one embodiment of the present technique, an aggregation function module 360 is used to determine the number of hops required for the aggregated packet to reach the base station. In one embodiment of the present technique, the aggregation functions such as average & standard deviation are limited to one hop only in the aggregation step, whereas aggregation function such as minimum, maximum can continue aggregation till the packets reach the base station, further reducing the number of packets transferred in the WSN.

The aggregated packets are forwarded to the base station based on the aggregation function through a network 370. The network may be at least one of a wireless network, such as Wi-Fi, or a wired network, such as local area network (LAN). It should be noted that the examples mentioned above are merely illustrative and should not be considered to be limiting.

In one embodiment of the present technique, the base station 380 may receive the aggregated packets and may be display the packets to user 390 for further action. Also, the user 390 may initiate certain changes in the special instruction sent through the base station 380 on occurrence of some predefined conditions.

Illustration:

Let us consider a temperature monitoring application in a WSN with average value as the aggregation function. Wireless sensor nodes may be deployed in a room or in an open space where there is a need for monitoring the temperature. The base station may be located either in the same room where the sensor nodes are deployed or in another room. The packets carrying the sensor data reach the base station at regular intervals of time. The packets are aggregated based on the category of the packets. The aggregation of the packets is performed based on the business logic used in the application. In case of critical data, the packets are sent to the base station as soon as possible without aggregation. Required alerts can be generated and transmitted to a concerned person if the temperature readings are considered as being events of interest. In case of normal and hello packets, since the aggregation function is average, the aggregation mechanism is considered up to one hop level only. After the packets are aggregated they are sent to a sink without further aggregation in the next levels.

The aggregation mechanism is selected based on the feedback value and the instruction generated at the base station depending on the business logic specific to that application.

In this application since the packets are generated after every one second at the each sensor node indicating the temperature reading. If there is no substantial change in the sensor reading from the previous value, ocal aggregation is performed. After performing the local aggregation, the packets may be considered for performing aggregation at the aggregator sensor node. Aggregation is performed for normal & hello packets and the aggregation mechanism is selected based on the feedback value and the instruction. As explained earlier, instructions are issued at the base station and the feedback value is generated at the aggregator node based on the DoA value and number of packets in the buffer queue of the aggregator node.

In this illustration, the business logic indicates the aggregation is lossy aggregation and the same is communicated to the aggregator node through to be special instruction for selecting the aggregation mechanism.

In this illustration, the feedback value calculated through the DoA value of the previous aggregated packet helps in determining the number of packets to be considered for aggregation.

In one embodiment of the present technique, the main advantage includes providing energy, bandwidth and memory space savings by minimizing the data transferred in WSN. Also, the aggregation approach helps in providing quality of service in data aggregation and providing proper scheduling of aggregation.

Exemplary Computing Environment

Figure 4:
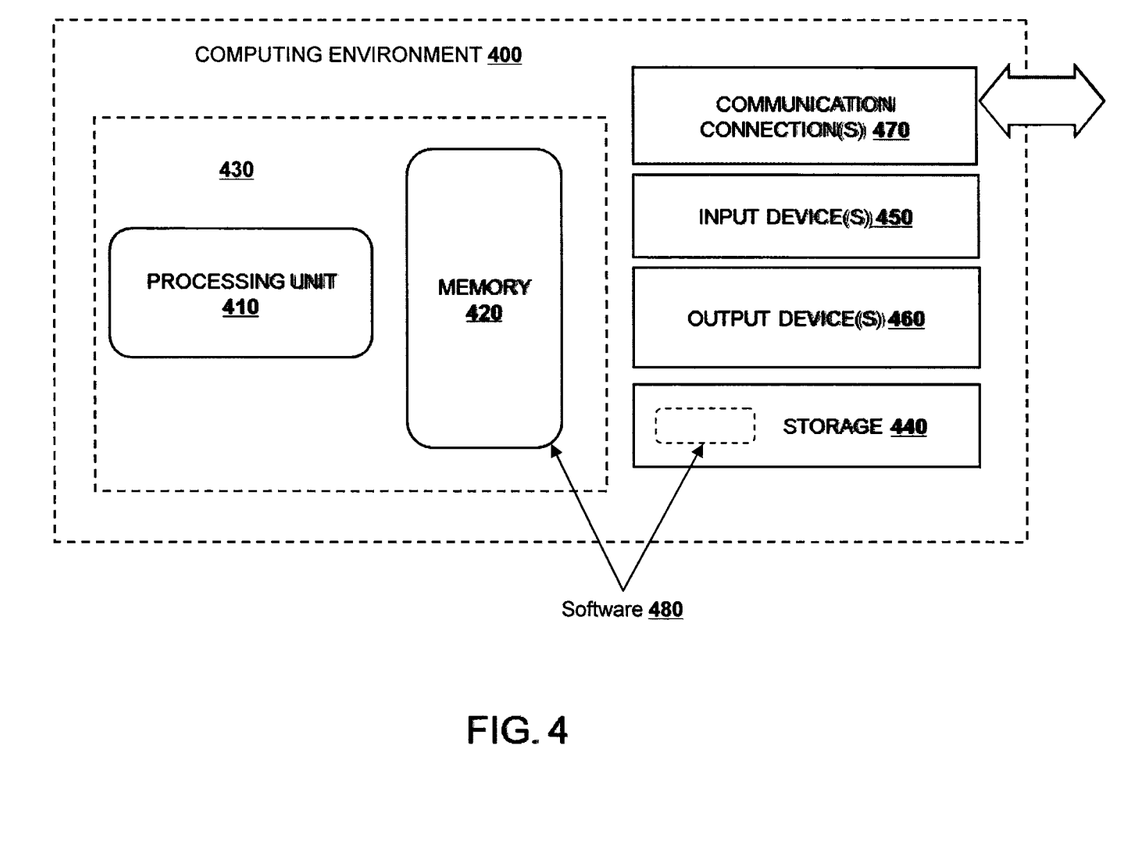
FIG. 4 is a system illustrating a generalized computer network arrangement, in one embodiment of the present technique.

One or more of the above-described techniques can be implemented in or involve one or more computer systems. FIG. 4 illustrates a generalized example of a computing environment 400. The computing environment 400 is not intended to suggest any limitation as to scope of use or functionality of described embodiments.

With reference to FIG. 4, the computing environment 400 includes at least one processing unit 410 and memory 420. In FIG. 4, this most basic configuration 430 is included within a dashed line. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. In some embodiments, the memory 420 stores software 480 implementing described techniques.

A computing environment may have additional features. For example, the computing environment 400 includes storage 440, one or more input devices 450, one or more output devices 460, and one or more communication connections 470. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other medium which can be used to store information and which can be accessed within the computing environment 400. In some embodiments, the storage 440 stores instructions for the software 480.

The input device(s) 450 may be a touch input device such as a keyboard, mouse, pen, trackball, touch screen, or game controller, a voice input device, a scanning device, a digital camera, or another device that provides input to the computing environment 400. The output device(s) 460 may be a display, printer, speaker, or another device that provides output from the computing environment 400.

The communication connection(s) 470 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 400, computer-readable media include memory 420, storage 440, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

The invention claimed is:

1. A computer implemented method of adaptive aggregation of data in a wireless sensor network (WSN), the method comprising:
   receiving data packets produced from a plurality of sensor nodes at an aggregator sensor node;
   initiating a process for aggregation of received data packets at the aggregator sensor node, wherein the aggregation process at the aggregator sensor node comprises:
     receiving a first feedback value or a first special instruction;
     selecting, from among a plurality of aggregation mechanisms for aggregating received data packets, a first aggregation mechanism for aggregating received data packets, wherein selection of the first aggregation mechanism is based on at least one of the received first feedback value or the received first special instruction;

aggregating a first set of received data packets into a first aggregated data packet based on the selected first aggregation mechanism;

receiving a second feedback value and a second special instruction, wherein the received second feedback value differs from the received first feedback value, or the received second special instruction differs from the received first special instruction;

selecting, from among the plurality of aggregation mechanisms for aggregating received data packets, a second aggregation mechanism for aggregating received data packets, wherein selection of the second aggregation mechanism is based on at least one of the received second feedback value or the received second special instruction; and aggregating a second set of received data packets into a second aggregated data packet, based on the selected second aggregation mechanism;

wherein the number of received data packets aggregated within the second aggregated data packet generated by an aggregator sensor node implementing the second aggregation mechanism differs from the number of received data packets aggregated within the first aggregated data packet generated by said aggregator sensor node implementing the first aggregation mechanism.

2. The method as recited in claim 1, wherein the step of receiving the data packets is preceded by the step of performing a local aggregation of sensor data generated by the plurality of sensor nodes.

3. The method as recited in claim 1, wherein the data packets are stored in a buffer queue for aggregation within the aggregator sensor node.

4. The method of claim 3, wherein the step of storing data packets in the buffer queue is preceded by the step of segregating received data packets into a first category of data packets and a second category of data packets, wherein the first category of data packets are forwarded by the aggregator sensor node without aggregation, and the second category of data packets are stored in the buffer queue for aggregation by the aggregator sensor node.

5. The method as recited in claim 4, wherein the first category of packets comprises one or both of critical packets or control packets, which critical packets or control packets are forwarded by the aggregator sensor node without aggregation.

6. The method as recited in claim 1, wherein the step of aggregating the one or more packets at the aggregator sensor node is executed subsequent to determining that the aggregator sensor node has received more than a prescribed number of packets of a particular category from the plurality of sensor nodes.

7. The method as recited in claim 1, wherein the first and second feedback values specify a number of packets to be considered for aggregation of the first set of received data packets and the second set of received data packets respectively.

8. The method of claim 7, wherein the number of packets to be considered for aggregation of the second set of received data packets is calculated based on at least one of:

a degree of aggregation (DoA) value of a previously aggregated packet resulting from aggregation of an earlier set of received data packets, and the number of packets of a particular category in the buffer queue of the aggregator node.

9. The method of claim 8, wherein the feedback value in a first iteration of the aggregation is set based on at least one of:

an initial DoA value, and the number of packets of the particular category in the buffer queue of the aggregator node.

10. The method of claim 7, wherein the number of packets to be considered for aggregation is calculated based on at least one of a range of packets and a time interval chosen for the aggregation process.

11. The method of claim 10, wherein the range of packets and the time interval chosen for the aggregation process are selected based on an application for which the plurality of sensor nodes are deployed in the WSN.

12. The method of claim 10, wherein the range of packets and the time interval chosen for the aggregation process are periodically updated based on continuous learning of the aggregation process.

13. The method as recited in claim 1, wherein the received data packets belong to the same category.

14. The method as recited in claim 1, wherein the received data packets belong to different categories.

15. The method as recited in claim 1, wherein the special instruction is generated at the base station on occurrence of a predefined condition.

16. The method of claim 15, wherein the special instruction comprises one or more details to select the aggregation mechanism.

17. The method of claim 16, wherein the one or more details include an aggregation technique and a number of packets to be considered for aggregation.

18. The method of claim 17, wherein the aggregation technique is any one of lossy aggregation, lossless aggregation, time-based aggregation and count-based aggregation.

19. The method of claim 15, wherein the special instruction is generated at the base station based on information derived from the control packets received from the one or more sensor nodes of the WSN.

20. The method of claim 15, wherein the special instruction is generated at the base station based on an application for which the pluralities of sensor nodes were deployed in WSN.

21. The method as recited in claim 1, further comprising forwarding the aggregated packets from the aggregator sensor node to the base station based on an aggregation function.

22. The method of claim 21, wherein the aggregation function comprises at least one of a single hop function and a multi hop function.

23. A system for adaptive aggregation of data in a wireless sensor network (WSN), the system comprising:

an aggregator sensor node configured to receive data packets produced from a plurality of sensor nodes, and wherein the aggregator sensor node is configured to:

segregate the received data packets at the aggregator sensor node based on a category of the received data packets;

receive a first feedback value or a first special instruction;

select, from among a plurality of aggregation mechanisms for aggregating received data packets, a first aggregation mechanism for aggregating received data packets, wherein selection of the first aggregation mechanism is based on at least one of the received first feedback value or the received first special instruction;

perform the aggregation of a first set of received data packets into a first aggregated data packet based on the selected first aggregation mechanism;

select, from among the plurality of aggregation mechanisms for aggregating received data packets, a second aggregation mechanism for aggregating received data packets, wherein selection of the second aggregation mechanism is based on at least one of the received second feedback value or the received second special instruction; and aggregate a second set of received data packets into a second aggregated data packet, based on the selected second aggregation mechanism, wherein the number of received data packets aggregated within the second aggregated data packet generated by an aggregator sensor node implementing the second aggregation mechanism differs from the number of received data packets aggregated within the first aggregated data packet generated by such aggregator sensor node implementing the first aggregation mechanism selected second aggregation mechanism.

24. The system as recited in claim 23, further comprising a plurality of source sensor nodes configured in the WSN for performing a local aggregation of sensor data generated from the plurality of sensor nodes.

25. The system as recited in claim 23, wherein the aggregator sensor node comprises a buffer for storing the segregated packets in one or more queues within the aggregator sensor node.

26. The system as recited in claim 23, wherein the aggregator sensor node is further configured such that the first and second feedback values specify a number of packets to be considered for aggregation of the first set of received data packets and the second set of received data packets respectively.

27. The system as recited in claim 23, wherein the aggregator sensor node is further configured to receive the special instruction from a base station.

28. The system as recited in claim 23, wherein the aggregator sensor node is further configured to determine at least one of a single hop function and a multi hop function of the aggregated packets.

29. A computer program product comprising a non-transitory computer usable medium having a computer readable program code embodied therein for adaptive aggregation of data in a wireless sensor network (WSN), the computer program product comprising:

a program code adapted for:

receiving data packets produced from a plurality of sensor nodes at an aggregator sensor node;

initiating a process for aggregation of received data packets at the aggregator sensor node, wherein the aggregation process at the aggregator sensor node comprises:

receiving a first feedback value or a first special instruction;

selecting, from among a plurality of aggregation mechanisms for aggregating received data packets, a first aggregation mechanism for aggregating received data packets, wherein selection is based on at least one of the received first feedback value or the received first special instruction;

aggregating a first set of received data packets into a first aggregated data packet based on the selected first aggregation mechanism;

receiving a second feedback value and a second special instruction, wherein the received second feedback value differs from the received first feedback value or the received second special instruction differs from the received first special instruction;

selecting, from among the plurality of aggregation mechanisms for aggregating received data packets, a second aggregation mechanism for aggregating received data packets wherein selection of the second aggregation mechanism is based on at least one of the received second feedback value or the received second special instruction; and aggregating a second set of received data packets into a second aggregated data packet based on the selected second aggregation mechanism, wherein the number of received data packets aggregated within the second aggregated data packet generated by an aggregator sensor node implementing the second aggregation mechanism differs from the number of received data packets aggregated within the first aggregated data packet generated by such aggregator sensor node implementing the first aggregation mechanism.

30. The method as recited in claim 4, wherein the aggregation sensor node queues a data packet for aggregation processing only upon determining that the data packet is one of a hello packet or a normal packet.

* * * * *